United States Patent [19]

Truax

[11] Patent Number: 5,279,236
[45] Date of Patent: Jan. 18, 1994

[54] SEED PLANTER

[76] Inventor: James R. Truax, 3717 Vera Cruz Ave., Minneapolis, Minn. 55422

[21] Appl. No.: 96,827

[22] Filed: Jul. 26, 1993

Related U.S. Application Data

[63] Continuation of Ser. No. 722,943, Jun. 28, 1991, abandoned.

[51] Int. Cl.$^5$ .............................................. A01C 5/00
[52] U.S. Cl. .................................. 111/139; 111/169; 111/924; 172/498; 172/705
[58] Field of Search ................ 111/139, 14, 140, 192, 111/121, 140, 157, 163, 168, 169, 61, 62, 924, 926; 172/498, 705, 707, 710, 711, 776, 734, 739

[56] References Cited

U.S. PATENT DOCUMENTS

| | | | |
|---|---|---|---|
| 621,865 | 3/1899 | Smith | 172/498 |
| 2,339,468 | 1/1944 | Ego | 172/498 |
| 2,649,725 | 8/1953 | Oehler et al. | 111/62 |
| 3,575,243 | 4/1971 | Mark et al. | 172/710 |
| 3,701,327 | 10/1972 | Krumholz | 111/140 |
| 4,030,428 | 6/1977 | Truax | 111/189 |
| 4,070,974 | 1/1978 | Stacy, Jr. | 111/169 |
| 4,267,783 | 5/1981 | Hendrix et al. | 111/924 |
| 4,368,783 | 1/1983 | Hake et al. | 172/705 |
| 4,425,973 | 1/1984 | Williams et al. | 111/139 |
| 4,483,401 | 11/1984 | Robertson | 111/739 |
| 4,596,200 | 6/1986 | Gafford et al. | 111/136 |
| 4,796,550 | 1/1989 | Van Natta et al. | 111/87 |
| 4,977,841 | 12/1990 | Truax | 111/62 |

FOREIGN PATENT DOCUMENTS 1037765 9/1978 Canada .............................. 172/705

OTHER PUBLICATIONS

ACRA-Plant Trash-Whipper brochure dated 1980.
*Soil Cutting and Tillage* by Edward McKyes, Elsevier Science Publishers B.V., 1985, p. 82.

Primary Examiner—Randolph A. Reese
Assistant Examiner—Spencer Warnick
Attorney, Agent, or Firm—Burd, Bartz & Gutenkauf

[57] ABSTRACT

A seed drill for planting seed in untilled ground. The drill is pulled by a prime mover and includes an array of double disk furrow opening assemblies in conjunction with a seed dispensing mechanism. The seed drill is equipped with an array of forwardly located trash disks in order to clear trash in the immediate vicinity ahead of each double disk furrow opening assembly. The trash disks clear the ground to facilitate the work of the furrow opening disks. Each trash disk assembly includes a circular trash disk rotatably mounted on a torque arm that is resiliently movable with respect to the frame of the machine. Each trash disk is mounted at an angle canted downward and forward between 15 and 25 degrees. The trash disk has a concave dish shape with a scalloped outer peripheral edge.

8 Claims, 5 Drawing Sheets

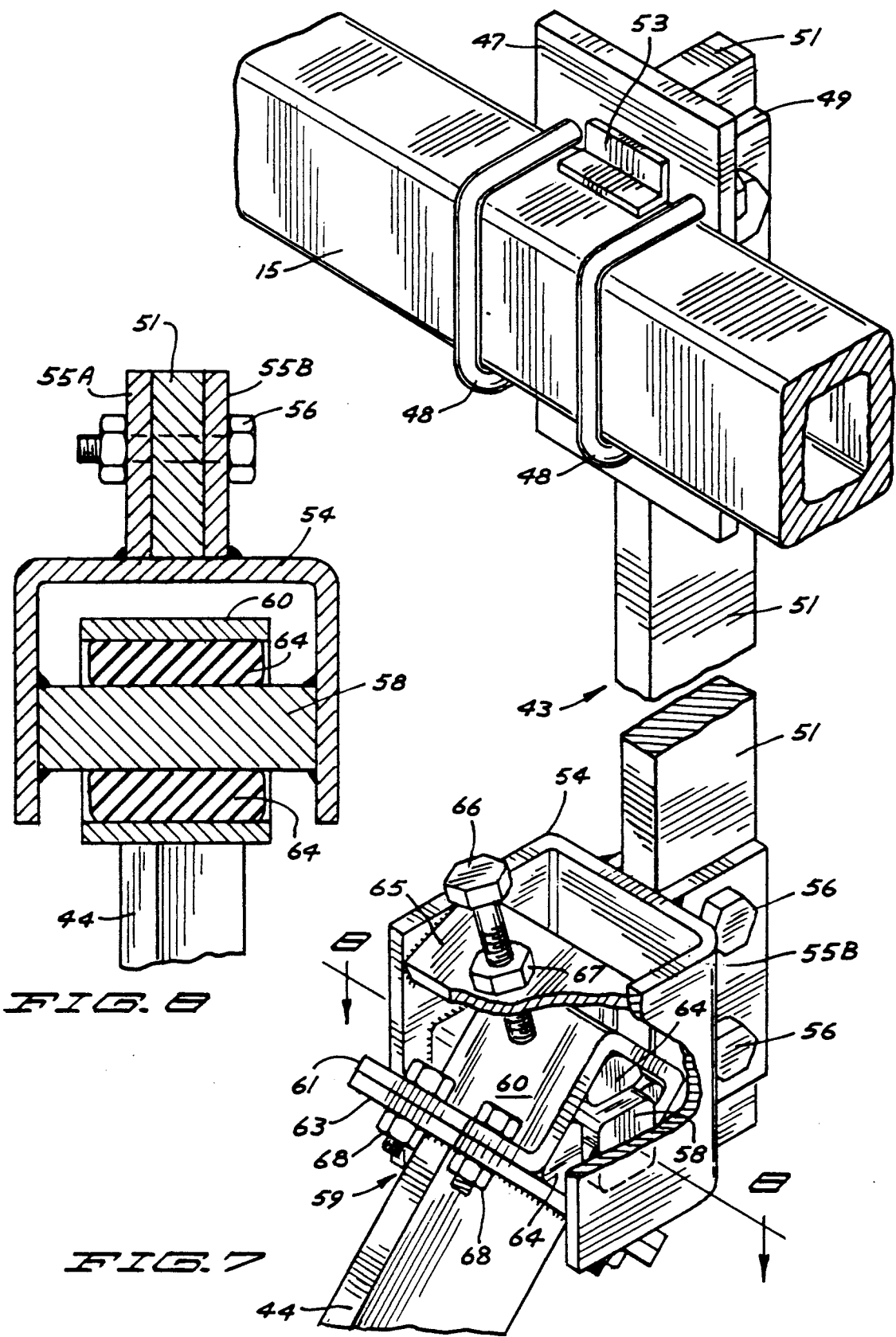

SEED PLANTER

This is a continuation of application Ser. No. 722,943 filed Jun. 28, 1991, now abandoned.

BACKGROUND OF THE INVENTION

The invention pertains to a seed drill for applying seeds such as grass seed to untilled ground. Furrow opening discs or blades of existing seed drills do not function well over hard untilled ground. Having to till the ground prior to using a seed planter to deposit seed is time consuming and expensive. For various considerations such as controlling erosion it is desirable to leave fields in untilled condition.

Untilled soil has an abundance of residual organic debris referred to as trash. In planting an untilled field, it is necessary to contend with the trash. On some machines this comprises the use of trash furrowing disks placed ahead of the seed planting mechanism in an attempt to move the trash aside. Most such machines are unsuccessful. Traditional trash disks crimp or knife the trash into the intended site of the seed slot. Upon subsequent seeding there is poor seed to soil contact. In addition, unwanted weed seed can be pulled up by traditional trash disks, to be left in the seed bed to germinate in competition with the planted seed.

SUMMARY OF THE INVENTION

The invention relates to a seed drill or planter for applying seed to untilled ground. The planter is pulled by a prime mover and can have usual seed drill equipment including furrow opening disks to open furrows in the soil or seed bed, seed dispensing mechanism, and press wheel machinery to close seeded furrows. In addition, the seed drill is equipped with an array of forwardly located trash disks in order to clear trash in the immediate vicinity, ahead of each set of furrow opening blades. The trash disks clear the ground to facilitate the work of the furrow opening disks. Each trash disk assembly includes a generally circular trash disk rotatably mounted on a movable torque arm for rotation about a trash disk axis. The arm mounts the trash disk at an angle so that the plane of the trash disk has an angular orientation with respect to a forward direction of movement. With respect to a reference plane that is vertical and parallel to the direction of movement of the seed drill, the plane of the trash disk is inclined or canted downward and forward in an amount which can be between 15 and 25 degrees in each direction. The trash disk has a concave dish shape with a scalloped outer peripheral edge. The configuration and orientation of the trash disk are effective to clear the ground of trash immediately ahead of the furrowing disks preparatory to formation of a furrow for planting seed. Seed is not deposited on crimped-in trash in the seed slot. A spring leveler assembly permits fine adjustment of the orientation of the trash disks whereby unwanted weed seed is not brought to the surface.

BRIEF DESCRIPTION OF THE DRAWINGS

FIG. 1 is a side elevational view of the forward portion of a seed drill according to the invention in a lowered position for working the ground and planting seed, with portions removed for purposes illustration;

FIG. 7 is an enlarged view in perspective showing the attachment of a trash disk assembly to the seed drill frame; and FIG. 8 is an enlarged sectional view of a portion of the attachment joint of FIG. 7 taken along the line 8—8 thereof.

DESCRIPTION OF A PREFERRED EMBODIMENT

Figure 2:
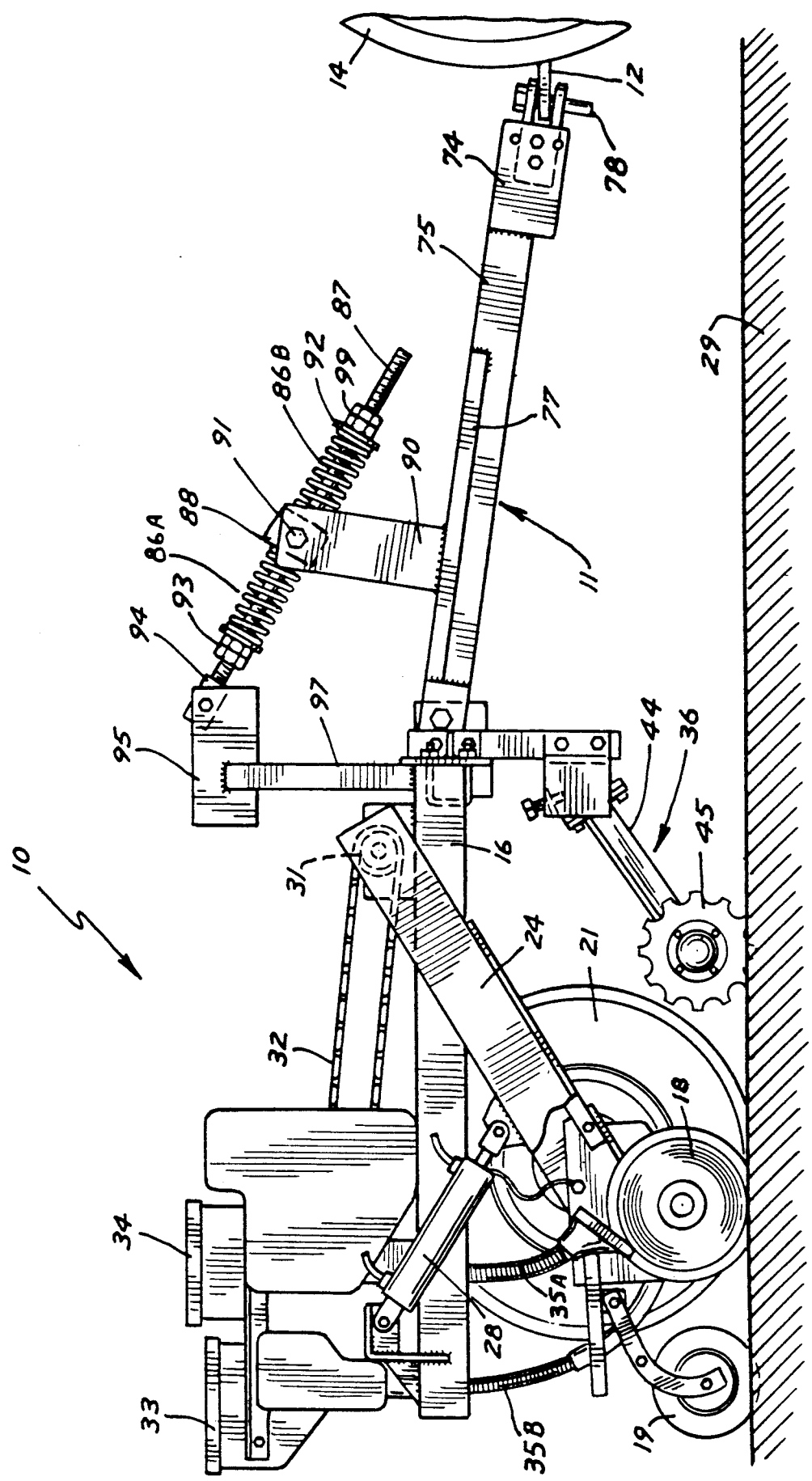
FIG. 2 is a side elevational view of the seed drill of FIG. 1 in a raised position for transport over the ground.

Referring to the drawings, there is shown in FIGS. 1 and 2 a seed drill machine 10 connected by a tongue assembly 11 to a hitch 12 on the rear end of a prime mover of which is shown a rear wheel 14. Seed drill 10 can be substantially like that shown and described in the specification of U.S. Pat. No. 4,977,841 issued Dec. 18, 1990 to James R. Truax and incorporated herein by reference, with the addition of trash disk assemblies to be described.

Seed drill machine 10 includes a frame having a forward lateral frame member 15 (FIGS. 4 and 5) connected to a right longitudinal side frame member 16 and left longitudinal and rear lateral frame members (not shown). Machine 10 includes a plurality of double disk furrowing assemblies 18 mounted in side by side relationship extending across the width of the frame in correspondence with the forward lateral frame member 15. A corresponding plurality of press wheel assemblies 19 are mounted laterally across the frame with one press wheel assembly in trailing relationship to each furrowing disk assembly.

Figure 4:
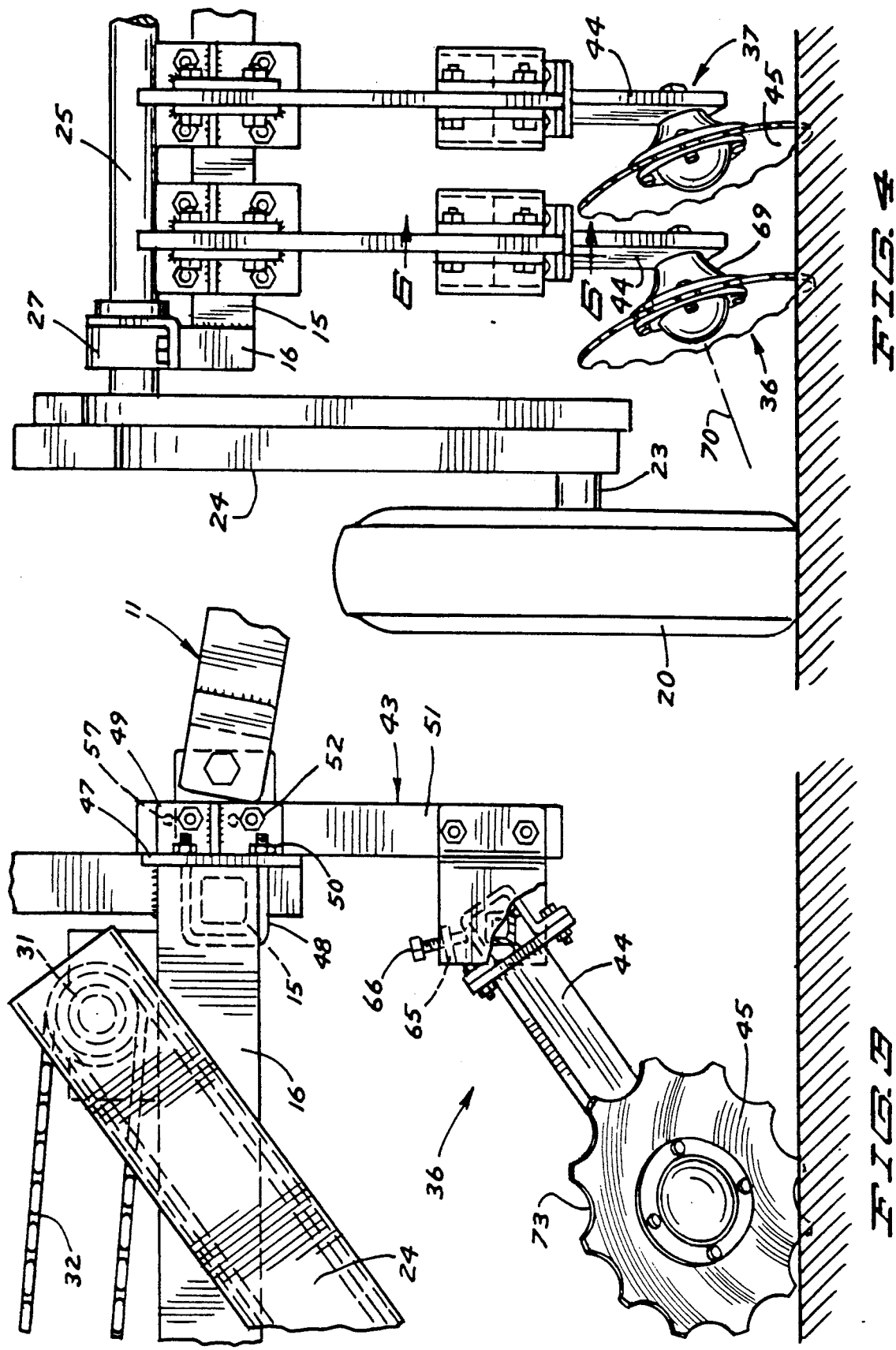
FIG. 4 is a front elevational view of the portion of the seed drill of FIG. 3.

The frame of machine 10 is supported by wheels and by mechanism for elevating and lowering the wheels with respect to the frame in order to move ground working equipment into and out of engagement with the ground. A right wheel 20 is shown in FIG. 4 and partially shown in FIG. 2, a portion thereof removed for purposes of illustration. A left wheel 21 is shown in FIGS. 1 and 2. Each wheel is rotatably assembled to one end of a mounting leg. The other end of the mounting leg is assembled to the frame. A hydraulic actuator or motor of the cylinder-rod variety is assembled between each mounting leg and the frame to move the leg and the wheel up and down relative to the frame.

FIG. 4 shows the right wheel 20 mounted on a short axle 23 rotatably assembled to one end of a mounting leg 24. The other end of mounting leg 24 is assembled in perpendicular relationship to the outboard end of a tubular shaft 25. Shaft 25 is carried by an outboard bearing assembly 27 that is secured to the right longitudinal frame member 16.

The right wheel 20, 21 is raised and lowered relative to the frame by a hydraulic motor 28 of the cylinder-rod variety. One end of the motor 28 is connected to a bracket fixed to the right longitudinal frame member 16. The opposite end carrying the reciprocating rod is fixed to the right wheel mounting leg 24. Extension of the motor 28 results in extension of the wheel 20 away from the frame to raise the frame relative to a ground surface 29 as shown in FIG. 2. Retraction of the cylinder 28 is effective to move the wheel toward the frame and bring ground engaging equipment in working proximity to the ground surface 29 as shown in FIG. 1.

Either or both wheels 20, 21 can be a drive wheel to operate the seeder mechanism of machine 10 to distribute seed in furrows opened by the furrowing disk assemblies 18 as machine 10 is advanced over an untilled field under tow. Right wheel 20 can operate a chain (not shown) co-extensive with the right wheel mounting leg 24 which results in rotation of a sprocket 31 mounted just above the right longitudinal frame member 16 (FIG. 1) which in turn results in driving a second chain 32 to operate a seeder mechanism to deliver seed from seed hoppers 33, 34 through seed delivery tubes 35A, 35B which are mounted proximate the furrow opening disc assemblies 18.

Figure 5:
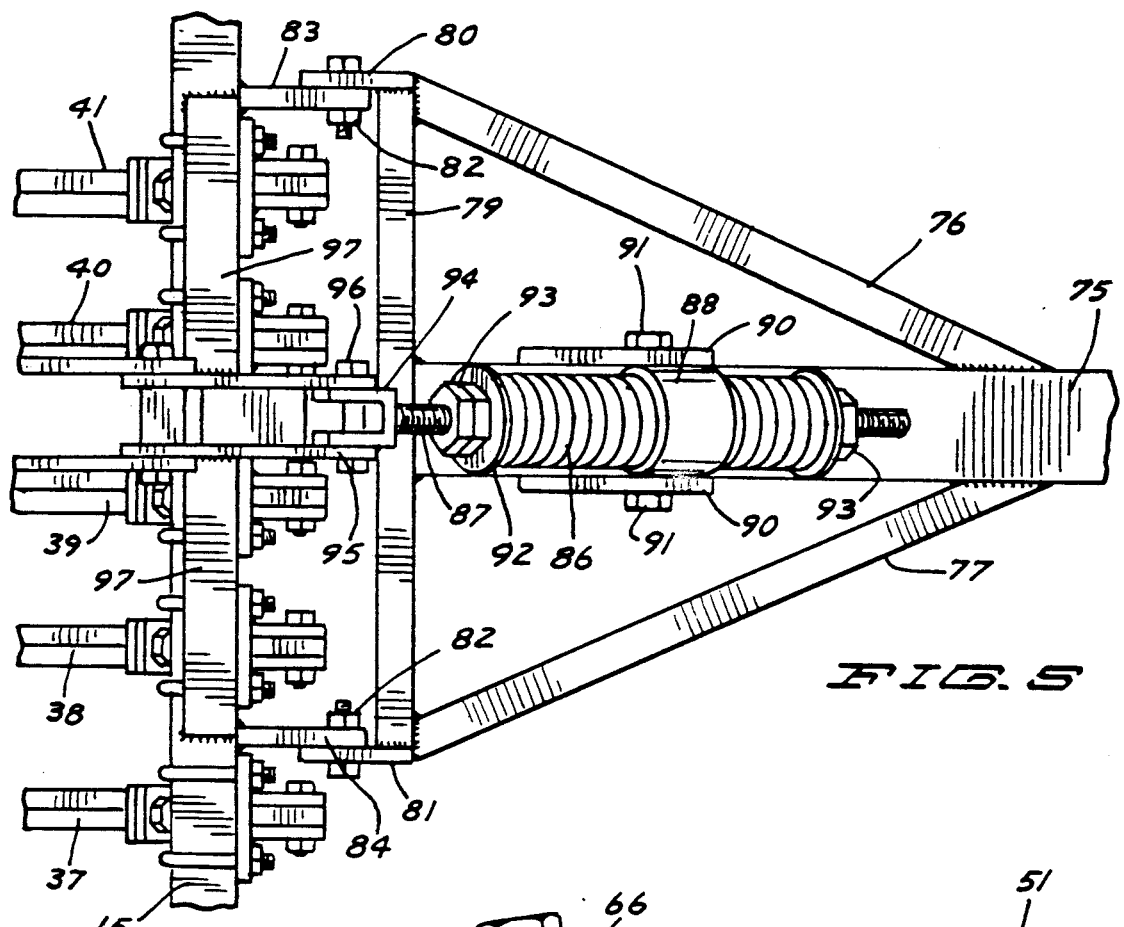
FIG. 5 is an enlarged top plan view of a portion of the seed drill of FIG. 1.
Figure 6:
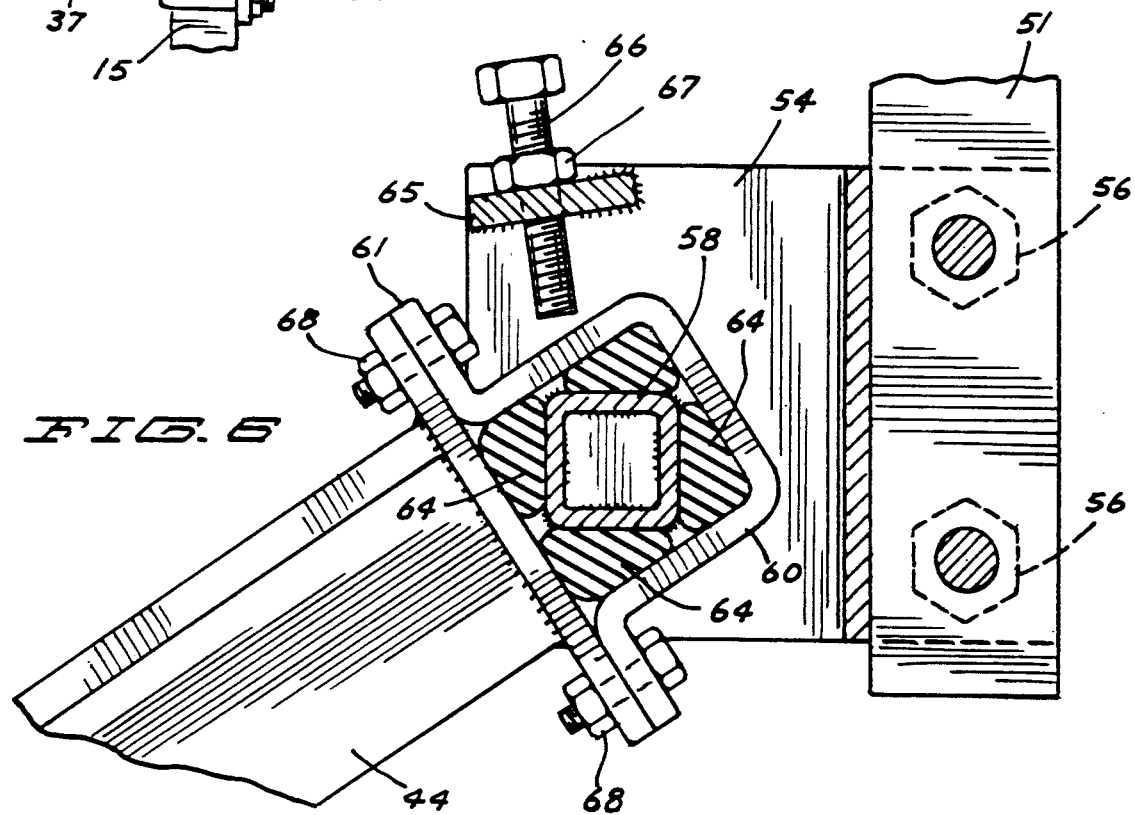
FIG. 6 is an enlarged sectional view of a portion of the seed drill of FIG. 4 taken along the line 6-6 thereof.

Seed drill machine 10 includes a plurality of trash disk assemblies, one trash disk assembly preceding each furrowing disk assembly substantially directly in front of it in the intended direction of travel of the machine. The purpose of the trash disk assembly is to clear away trash ahead of the furrowing disk assembly in preparation for the planting of the seed. It does this independent of movement of the furrowing disk assembly and in close conformance to the ground contour. This eliminates the necessity of having a tilled field preparatory to use of a seed drill. An end trash disk assembly 36 is shown in FIGS. 1, 2, 3 and 4, and intermediate trash disk assemblies 37-41 are shown in FIG. 5.

Figure 3:
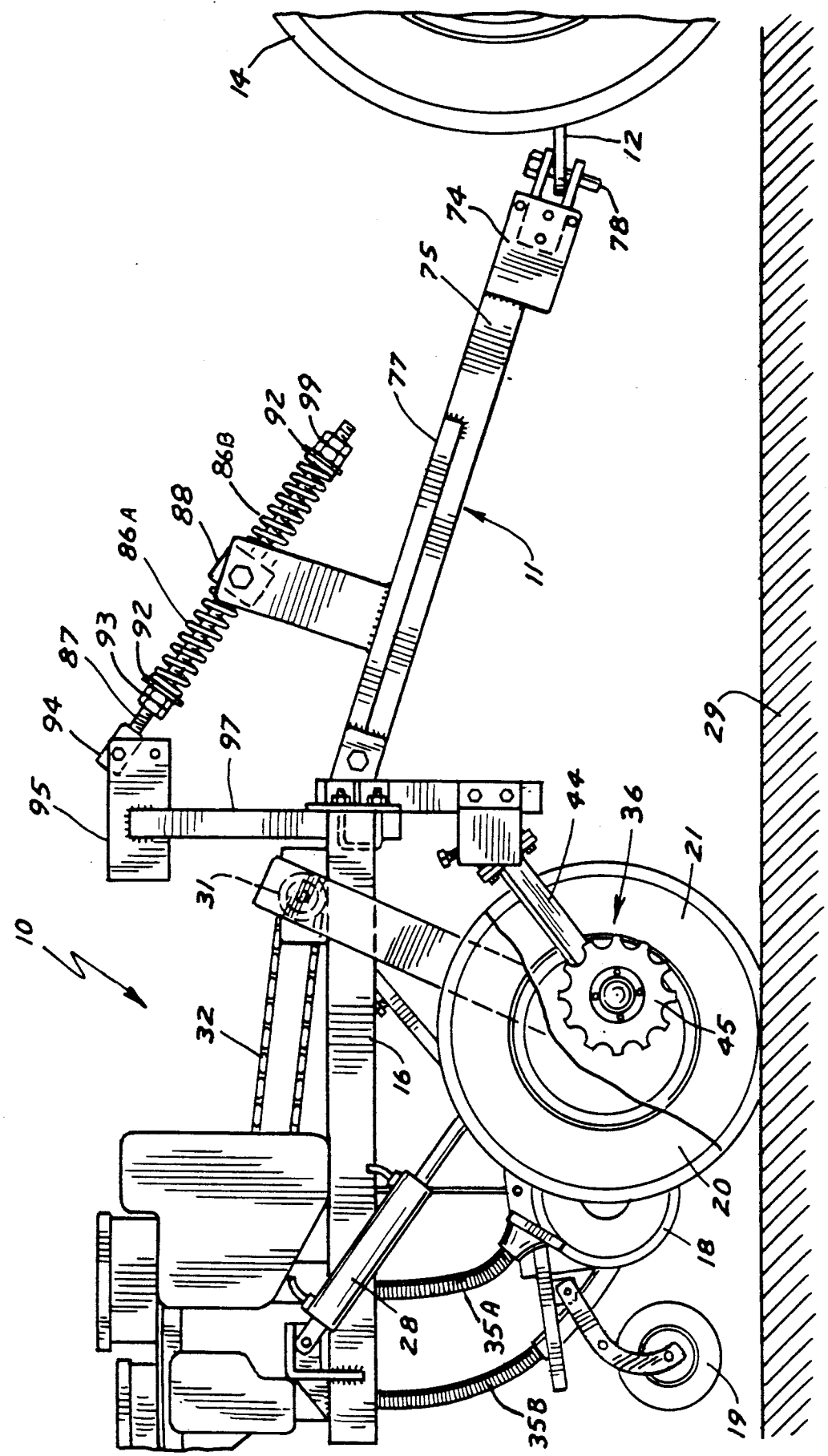
FIG. 3 is an enlarged side elevational view of a portion of the seed drill of FIG. 1 with portions removed for purposes of illustration.

The trash disk assemblies are mounted on the forward lateral frame member 15. Viewing the end tilling disc assembly 36 as representative, it includes vertical mounting beam structure 43 carrying a torque arm 44 having a trash disk 45 mounted thereon. As shown in FIG. 7, the mounting beam structure 43 includes a flat plate 47 disposed adjacent and flush a vertical side of the frame member 15. U bolts 48 extend around the opposite side of the beam 15 and are fastened at their ends on the opposite surface of the mounting plate 47 by nuts 50 (FIG. 3). An upper key member 53 and a corresponding lower key member (not shown) are fixed to plate 47 and straddle frame member 15 to securely position plate 47 with respect to it. Vertical mounting plates 49 extend away from the surface of the flush mounting plate 47 opposite the frame member 15 and are fixed to the flush mounting plate 47 by suitable means such as welding. A vertical support beam 51 is fixed to the mounting plates 49 by suitable means such as nut and bolt assemblies 52. The support beam 51 extends downwardly from the frame member 15. Additional mounting openings indicated in phantom at 57 in FIG. 3 for receipt of nut and bolt assemblies 52 permit vertical adjustment of support beam 51.

The lower end of support beam 51 carries a torsion joint 59 that connects the torque arm 44. A torque arm mounting bracket includes a U-shaped member 54 having parallel spaced apart bracket plates 55A, B welded thereto that closely straddle support beam 51 and are fastened to it by nut and bolt assemblies 56. A horizontal knuckle bar 58 is secured between the legs of U-shaped member 54 by suitable means such as welding. A torsion joint housing 60 is U-shaped and has outwardly extended flanges 61 that abut a flange 63 on the end of torque arm 44 fastened there together by a nut and bolt assemblies 68. The housing 60 surrounds the knuckle bar 58. Housing 60 is angularly orientated with respect to the knuckle bar 58 forming pockets between the interior corners of the housing 60 and the flat surfaces of the knuckle bar 58. Torsion spring elements 64 occupy the four pockets formed between the interior of housing 60 and the flat surfaces of knuckle bar 58. Each torsion spring element is formed of a resilient, strong plastic or rubber material which is resiliently deflectable under load. The spring elements are of a length to span the width of the housing 60. A flexible elastomer-type material such as urethane, neoprene, butyl or similar material is preferred for the characteristics of resiliency, high compression strength and resistence to outdoor elements. The elastomer preferably has an elasticity characteristic of approximately 70-95 durometer hardness.

Each torque arm is rotatable independent of the others and independent of the frame of machine 10 whereby each corresponding trash disk can closely follow the contour of the ground surface. Rotational movement of the torque arm 44 about torsion joint 59 is limited by a stop assembly including a stop plate 65 extended between the interior side walls of the U-shaped member 54 above the torsion joint 59. A stop bolt 66 passes through a suitable opening in the stop plate 65 and is threaded through a nut 67 welded to the plate 65. The end of the bolt poised over the torsion joint 59 positioned to come in contact with the housing 60 limits the rotational movement of the torsion joint 59 and torque arm 44. This is adjusted by threading the bolt 66 with respect to the nut 67.

Trash disk 45 is rotatably mounted by a hub assembly 69 to the lower end of torque arm 44. Torque arm 44 mounts the trash disk 45 with an axis indicated at 70 in FIG. 4 that is canted downwardly from the horizontal and forwardly with respect to a lateral direction or a direction perpendicular to the intended direction of travel of machine 10. For example, trash disk axis 70 can be canted downward between 15 and 25 degrees or approximately 20 degrees and forward the same amount with respect to a lateral direction. This angular orientation of the trash disk 45 provides for proper engagement of the ground surface 29 to clear away trash preparatory to planting seed therein. The trash disk 45 can have a scalloped or serrated outer peripheral edge 73. The scalloped edge 73 together with the angular orientation of trash disk 45 greatly enhances the ability to clear the ground surface ahead of the planting assembly.

Referring to FIGS. 1, 2 and 5, tongue assembly 11 includes a drawbar 75 connected to a horizontal crossbar 79. Diagonal brace members 76, 77 extend from the ends of the crossbar 79 to the drawbar 75. The crossbar 79 is pivotally connected to the forward transverse or lateral frame member 15. End mounting members 80, 81 extend rearwardly from the crossbar 79. Corresponding frame member mounting lugs 83, 84 extend forwardly from the transverse frame member 15. Nut and bolt assemblies 82 pivotally connect the crossbar mounting members 80, 81 to the mounting lugs 83, 84.

A spring leveler assembly is connected between the draw bar 75 and the remainder of machine 10 including a leveler assembly helical springs 86A, 86B mounted in surrounding relationship to a leveler assembly rod 87 having rearward and forward threaded ends. The purpose of the leveler assembly is to level the frame of machine 10 in order that the packing wheel assemblies 19 function properly and to permit fine adjustment of the penetration depth of the trash disks 45 of the trash disk assemblies. This is accomplished by varying the angular relationship between the tow bar 75 and the frame of machine 10 which will vary according to the height of the hitch 12 of the prime mover towing the machine 10. Spring 86A is retained by lock nuts 93 at the rearward end. Spring 86B is retained by another pair of lock nuts 99 at the forward end. Washers 92 are disposed between the lock nuts and the springs 86A, 86B. A pivot block or trunnion 88 surrounds rod 87. A pair of upstanding mounting plates 90 extend upwardly from the draw bar 75. Trunnion 88 is mounted between the plates 90 by pivot mounts 91. Confronting ends of springs 86A, 86B bear against trunnion 88.

A mounting block is formed by a pair of plates 95 which are secured to angularly orientated braces 97 that extend upwardly from forward lateral frame member 15. A clevis 94 is located on the upward and rearward end of the rod 87. Clevis 94 is pivotally connected between the plates 95 by a nut and bolt assembly 96 (FIG. 5).

The length of rod 87 between trunnion 88 and clevis 94 is adjustable. This length determines the angular orientation of the draw bar 75 and the frame of machine 10. Lengthening this length increases the angle between the draw bar 75 and the frame of machine 10. Shortening of this length decreases the same angle. In the orientation of FIG. 1, shortening of the length between the trunnion 88 and the clevis 94 is effective to cause deeper penetration of the trash disks 45. Lengthening of the dimension will lift the frame of machine 10 relative to the draw bar 75 resulting in decreasing the depth of penetration of the trash disks 45. The dimension is lengthened by moving the forward lock nuts 99 downward or forward on the rod 87. It is shortened by moving the forward lock nuts 99 upward or rearwardly on the rod 87. The lock nuts 93 can also be adjusted as well in order to set the tension in the spring leveler assembly spring 86.

The spring leveler assembly is used in the first instance to level the frame of machine 10 with the draw bar 75 connected to a hitch 12 of a prime mover and being at a certain height. The frame of machine 10 must be leveled according to the height of the hitch 12. In a preferred procedure, the wheels 20, 21 are retracted according to the configuration of FIG. 1 and are placed on boards. Adjustment of support beam 51 is made until the trash disks 45 just touch the ground surface 29. Lock nuts 99 are manipulated to the point where the plane of the frame of machine 10 is level. When the boards are removed and the machine 10 is drawn over the ground, the blades 45 will achieve a ground penetration of approximately the desired amount. The depth of this penetration is varied again by adjustment of the lock nuts 99 to vary the length or dimension of rod 87 between the trunnion 88 and the clevis 94. The alteration of the level of the frame of machine 10 by this slight adjustment is negligible. The depth of penetration of trash disks 45 can be adjusted according to ground conditions. For example, in soft ground a lesser amount of penetration of the ground is desired in order to avoid bringing up weed seeds. For hard ground, a more aggressive orientation of the trash disks is desirable and they can be adjusted for a slightly deeper penetration of the ground.

In use, bifurcated hitch 74 at the end of draw bar 75 is connected to the hitch 12 of the prime mover by means of a hitch pin 78. The machine is leveled with respect to the particular prime mover as earlier described. The machine 10 is drawn over untilled land. The trash disks 45 penetrate the ground slightly ahead of the furrow opening disks 18 and move trash to the side thereby clearing a localized seed bed. Seed is planted behind the furrow opening disks 18 and the furrow is then closed by the packer wheel assembly 19. The angle of orientation of the trash disk 45 is effective to maximize the trash clearing procedure. The trash disk 45 rotates about its own axis as it operates upon the ground and about the torque arm 44 which rotates about the torsion joint formed by torsion spring element 64. Each torsion arm 44 operates independently of the others and independently of the frame of machine 10 whereby each individual trash disk readily follows the ground contour for optimum performance.

The embodiments of the invention in which an exclusive property or privilege is claimed are defined as follows:

1. A seed drill for forming and planting seed in furrows in untilled soil, comprising:

a frame having sides and forward and rearward ends; said frame having a lateral forward frame member;

wheels assembled to the frame for movement of the frame in an intended forward longitudinal direction;

a plurality of double disk furrowing assemblies mounted in side-by-side relationship extending across the width of the frame;

a corresponding plurality of trash disk assemblies assembled to the frame in side-by-side relationship and extending the width of the frame, each trash disk assembly including a support beam extending downward from the forward lateral frame member, a torque arm connected to the support beam at one end, a trash disk rotatably assembled to the opposite end of the torque arm for rotation about a trash disk axis, said trash disk being concave and having an outer perimeter that is scalloped, said torque arm mounting the trash disk with the trash disk axis at an angle that is directed downward between 15 and 25 degrees with respect to horizontal and forward an angle between 15 and 25 degrees with respect to a direction that is perpendicular to the intended direction of travel of the machine; one trash disk assembly immediately preceding each furrow forming assembly to clear away trash ahead of the furrow forming assembly independent of movement of the furrow forming assembly and including a torsion joint movably and resiliently connecting the opposite end of each torque arm of each trash disk assembly to the support beam in such a way as to permit rotation of the torque arm in a vertical plane about the torsion joint independent of the other torque arms to allow the trash disk to closely follow the contour of the ground surface that is to be engaged by a corresponding furrow forming assembly; each said torsional joint including a horizontal transverse knuckle bar that is rectangular in cross-sectional shape with flat surfaces, a torsion joint housing that is rectangular in shape with interior corners and is in surrounding relationship to the knuckle bar and angularly oriented with respect to it, said torsion joint housing being connected to the torque arm, a plurality of torsion spring elements located between the interior corners of the torsion joint housing and flat surfaces of the knuckle bar;

and means restraining each torque arm from rotation in a horizontal plane.

2. The seed drill of claim 1 wherein: the torsion joint includes a horizontal transverse knuckle bar that is rectangular in cross-sectional shape having interior corners a torsion joint housing that is rectangular in shape and is in surrounding relationship to the knuckle bar and angularly orientated with respect to it, said torsion joint housing being connected to the torque arm, a plurality of torsion spring elements located between the interiors corners of the torsion joint housing and flat surfaces of the knuckle bar.

3. The seed drill of claim 2 including: a lock means located with respect to each trash disk assembly positioned to limit the amount of permissible rotation of the torque arm about the knuckle bar on said torsion joint.

4. The seed drill of claim 1 wherein: said seed drill includes a draw bar pivotally connected to a forward end of the frame, and a spring leveler assembly connected between the draw bar and the frame for varying the angle between the draw bar and the frame in order to level the frame and in order to make fine adjustment of the depth of penetration of the trash disks in the soil.

5. The seed drill of claim 4 wherein:
said spring leveler assembly includes leveler assembly helical spring means mounted in surrounding relationship to a leveler assembly rod that has rearward and forward threaded ends;
forward and rearward lock nuts threaded on the ends of the leveler assembly rod retaining the helical spring means thereon;
a trunnion surrounding a central portion of the rod, said spring means bearing against the trunnion;
means fixing the trunnion to the draw bar;
the rearward end of the leveler assembly rod having a clevis;
means pivotally connecting the clevis to the frame of the machine;
said forward lock nuts being movable on the rod to vary the dimension of the rod located between the trunnion and the clevis to alter the angular relationship between the frame and the draw bar.

6. A seed drill for forming and planting seed in furrows in untilled soil, comprising:
a frame having sides and forward and rearward ends;
said frame having a lateral forward frame member;
wheels assembled to the frame for movement of the frame in an intended forward longitudinal direction;
a plurality of double disk furrowing assemblies mounted in side-by-side relationship extending across the width of the frame;
a corresponding plurality of trash disk assemblies assembled to the frame in side-by-side relationship and extending the width of the frame, one trash disk assembly being located longitudinally ahead of a furrowing disk assembly, each trash disk assembly including a support beam extending downward from the forward lateral frame member, a torque arm connected to the support beam at one end, a trash disk rotatably assembled to the opposite end of the torque arm for rotation about a trash disk axis, said trash disk being concave and having an outer perimeter that is scalloped, said torque arm mounting the trash disk with the trash disk axis at an angle that is directed downward between 15 and 25 degrees with respect to a direction that is perpendicular to the intended direction of travel of the machine;
a torsion joint movably and resiliently connecting the torque arm to the support member of each trash disk assembly, said torsion joint including a horizontal transverse knuckle bar that is rectangular in cross-sectional shape with flat surfaces, a torsion joint housing that is rectangular in cross-sectional shape, with interior corners, and is in surrounding relationship to the knuckle bar and angularly orientated with respect to it, said torsion joint housing being connected to the torque arm, a plurality of torsion spring elements located between the interior corners of the torsion joint housing and flat surfaces of the knuckle bar;
a lock means located with respect to each trash disk assembly positioned to limit the amount of permissible rotation of the torque arm about the knuckle bar on said torsion joint, said lock means including a plate secured above the torsion joint housing, a threaded bolt engaging the plate in a threaded opening and movable toward and away from a position of contact with the torsion housing to vary the permissible limits of rotation of the torque arm.

7. The seed drill of claim 6 wherein: said seed drill includes a draw bar pivotally connected to a forward end of the frame, and a spring leveler assembly connected between the draw bar and the frame for varying the angle between the draw bar and the frame in order to level the frame and in order to make fine adjustment of the depth of penetration of the trash disks in the soil.

8. The seed drill of claim 7 wherein:
said spring leveler assembly includes leveler assembly helical spring means mounted in surrounding relationship to a leveler assembly rod that has rearward and forward threaded ends;
forward and rearward lock nuts threaded on the ends of the leveler assembly rod retaining the helical spring means thereon;
a trunnion surrounding a central portion of the rod, said spring means bearing against the trunnion;
means fixing the trunnion to the draw bar;
the rearward end of the leveler assembly rod having a clevis;
means pivotally connecting the clevis to the frame of the machine;
said forward lock nuts being movable on the rod to vary the dimension of the rod located between the trunnion and the clevis to alter the angular relationship between the frame and the draw bar.

* * * * *